Dec. 19, 1967   J. P. PROVENZA   3,358,886
MEASURING DISPENSER
Filed April 1, 1966   2 Sheets-Sheet 1
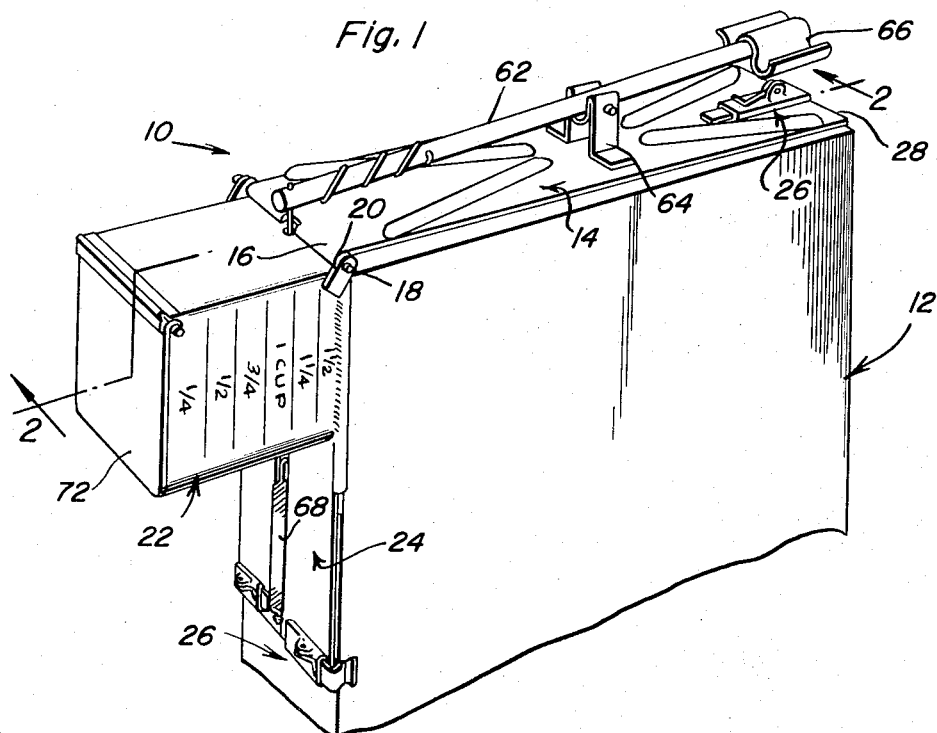
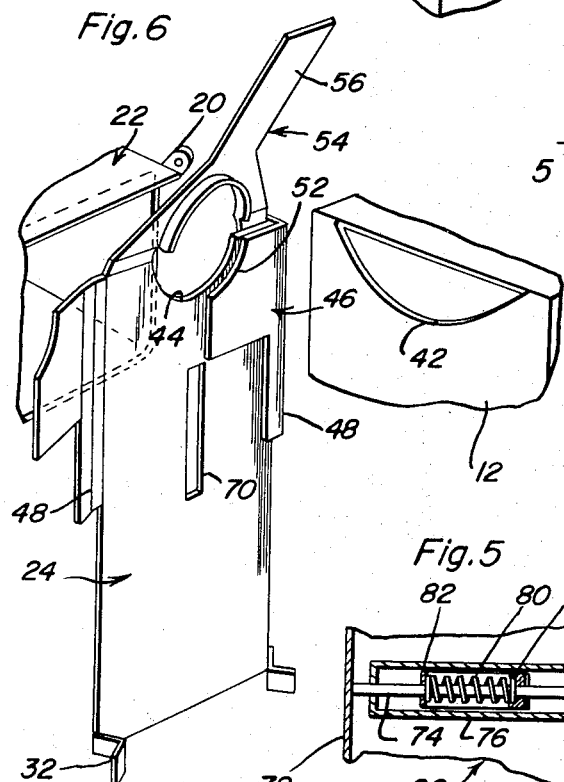
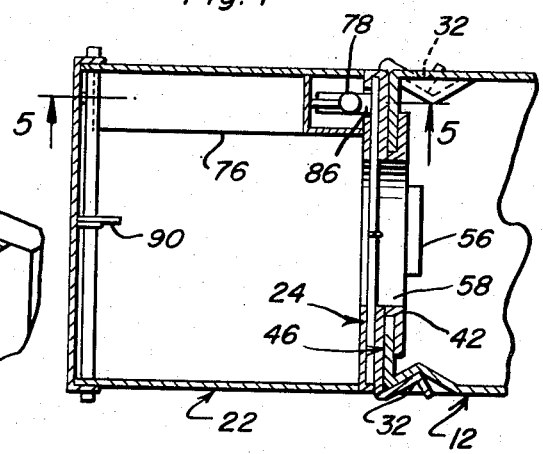
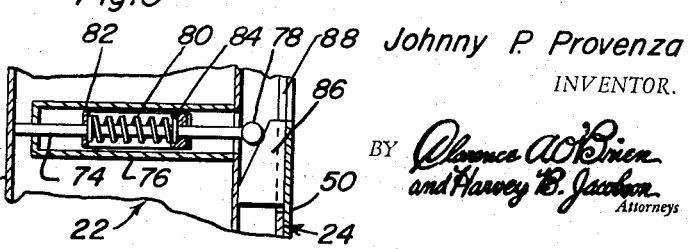
Johnny P. Provenza
INVENTOR.
BY *Clarence A. O'Brien*
*and Harvey B. Jacobson*
Attorneys Dec. 19, 1967    J. P. PROVENZA    3,358,886
MEASURING DISPENSER
Filed April 1, 1966    2 Sheets-Sheet 2
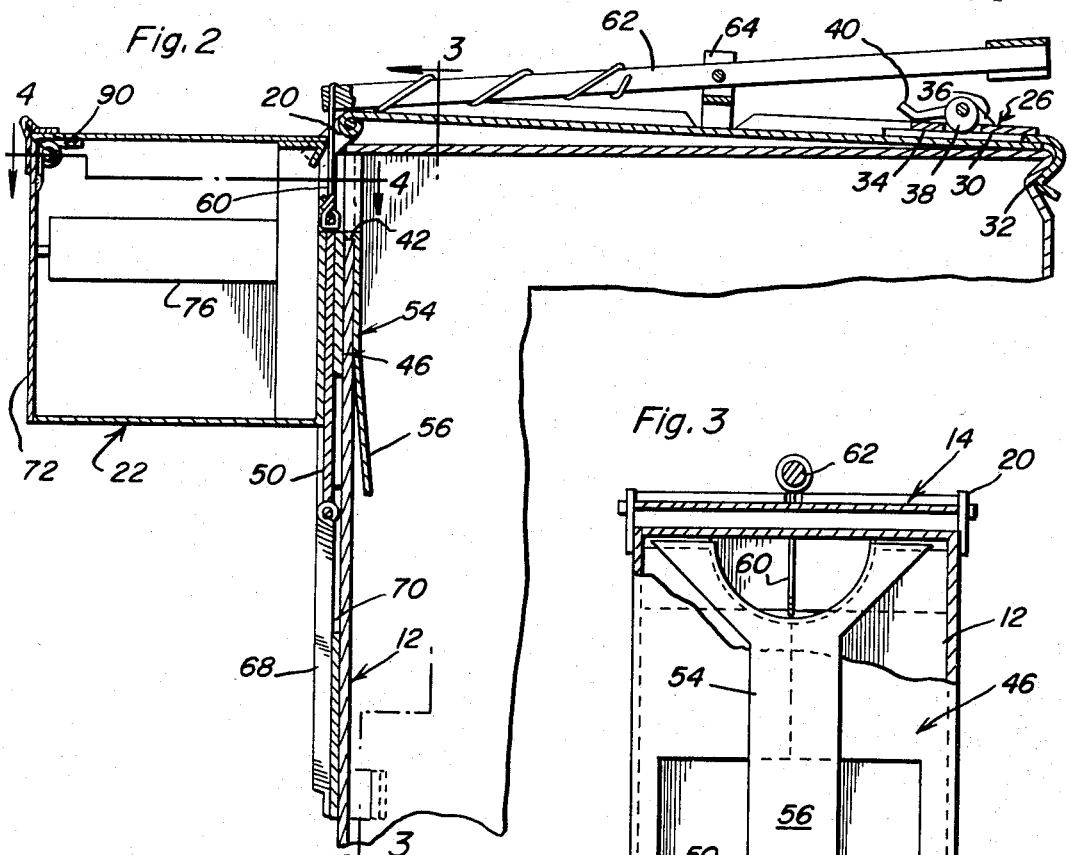
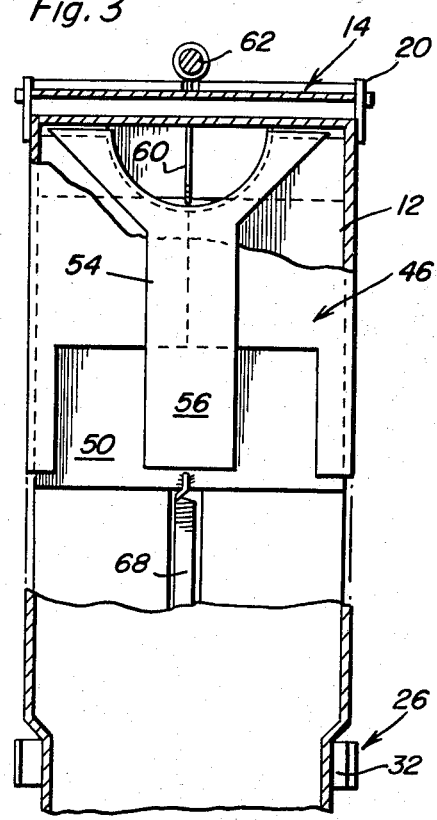
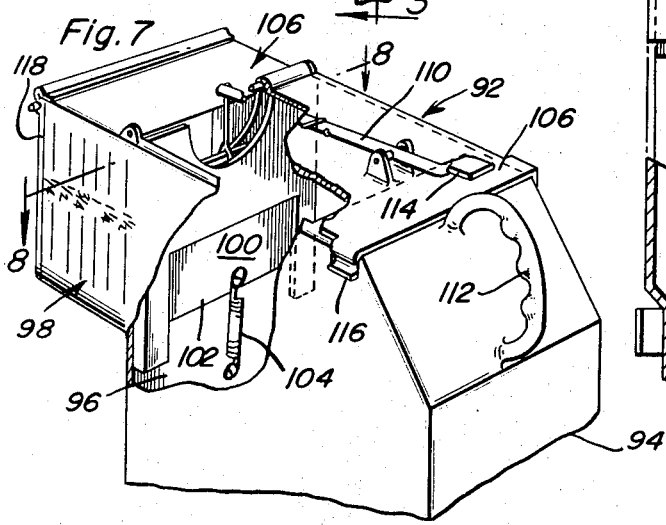
Johnny P. Provenza
INVENTOR.

3,358,886
MEASURING DISPENSER
Johnny P. Provenza, 9640 Kingston Road,
Shreveport, La. 71108
Filed Apr. 1, 1966, Ser. No. 539,506
8 Claims. (Cl. 222—158)

ABSTRACT OF THE DISCLOSURE

A measuring dispenser mountable upon a conventional soapbox in such a manner as to allow a granular soap product to enter a dual door cup-like device. This device is made of a transparent material with measurement graduations inscribed thereon thus allowing a user to transfer a predetermined amount of soap product from the container into the cup-like device. When the desired amount of soap has been so transferred a control rod device is digitally depressed thereby closing one of the doors in the cup-like device and preventing additional transfer of soap. The closing of this door is accompanied by the opening of the second door in the device allowing the free exit of the predetermined amount of soap product. Release of the control rod returns the mechanism into its initial position thereby allowing the user to again measure and dispense a predetermined amount of soap.

---

The instant invention is generally concerned with a device for facilitating the dispensing, from an enlarged container, of a granular or powder-like material such as soap powder. More particularly, the instant invention is concerned with a measuring dispenser mountable upon an enlarged container, for soap powder or the like, which receives, measures and segregates a predetermined amount of powder and subsequently effects a discharge of the predetermined amount of powder while retaining the main supply thereof within the enlarged container.

It is a primary object of the instant invention to provide a measuring dispenser which can be conveniently mounted on, or in fact formed integral with an enlarged box or the like which is to retain the supply of powder.

In conjunction with the above object, it is a particularly significant object of the instant invention to provide a powder measuring dispenser wherein the activation of a single level will effect a simultaneous segregation of the main supply from the dispensing component and an opening of the dispensing cup for a discharge of the measured contents therefrom.

Further, it is an important object of this invention to provide a dispenser which can be accommodated to different size conventional soap or detergent boxes.

It is an object of the instant invention to provide a soap dispenser which is of a relatively simple though sturdy nature capable of repeated use without danger of malfunction, clogging, or the like.

Basically, the measuring dispenser of the instant invention, in order to achieve the above objects, is constructed with top and front panels clampingly engaging the top and one side of a box or container, a dispensing cup mounted on the front panel adjacent the upper end thereof in a position so as to overlie the pouring hole normally provided in such containers, an elongated control rod mounted on the top panel, and both a gate for the segregation of the main container and the cup, and a dispensing door on the cup, both responsive to a movement of the control rod for simultaneously segregating the cup from the main container and dispensing the contents therefrom. As will be appreciated from the following, the instant invention also contemplates the provision of the dispenser integrally with a suitable container. In this instance, the top panel will be hingedly mounted on the container itself and form a lid for a filling opening, while the front panel of the dispenser will in fact be the front side of the container.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the dispenser of the instant invention mounted on a suitable container such as soap box or the like;

FIGURE 2 is an enlarged partial cross-sectional view taken substantially on a plane passing along line 2—2 of FIGURE 1;

FIGURE 3 is a cross-sectional view taken substantially on the plane passing along line 3—3 in FIGURE 2;

FIGURE 4 is a cross-sectional view taken substantially on a plane passing along line 4—4 in FIGURE 2;

FIGURE 5 is a partial cross-sectional view taken substantially upon a plane passing along line 5—5 in FIGURE 4;

FIGURE 6 is a partially exploded perspective view illustrating the construction of the front panel and associated mounting and guiding portions;

FIGURE 7 is a partial perspective view, with portions broken away for purposes of illustration, of a modified unit wherein the dispenser is integrally formed with the main container; and FIGURE 8 is a cross-sectional detail view taken substantially on a plane passing along line 8—8 in FIGURE 7.

Referring now more specifically to the drawings, reference numeral 10 is used to generally designate the measuring dispenser comprising the instant invention. This dispenser 10, with reference to FIGURES 1 through 6, is to be mounted upon a conventional soap box or the like 12, such boxes normally being in the nature of enlarged rectangular cardboard containers.

The dispenser 10 includes an elongated rectangular top mounting panel 14 of a length contemplated so as to span the top of a container 12 with this top panel 14 having the forward end 16 thereof rolled about an elongated pivot pin or rod 18 which is in turn rotatably received, at the opposite ends thereof, within upwardly projecting ears 20 on a forwardly projecting measuring cup 22, thereby providing a pivotal connection therebetween. The back wall of the measuring cup 22 is defined by a vertically elongated front mounting panel 24 which projects a substantial distance below the bottom of the measuring cup 22 for engagement with the front side of the container 12. This pivotal engagement between the mounting panels 14 and 24 facilitates the mounting and removal of the dispenser 10 in an obvious manner.

The fixing of the dispenser to the container 12 is achieved through three cooperating mounting clips 26, one mounted on the top panel 14 adjacent the back end 28 thereof for engagement with the back side of the box 12, and two mounted in opposition to each other on the lower end of the front panel 24 for engagement with the opposite faces of the box 12 adjacent the front edge thereof. Each of these mounting clips includes an elongated leg 30 slidably overlying the corresponding panel either 14 or 24, and a reversely bent leg 32 defining an inwardly extending V-shaped grip or clamping portion which is to bitingly engage into the container 12. A sleeve-like member 34 is fixed to the corresponding panel and received over the straight leg 30 of the corresponding clip 26 with this sleeve-like member 34 mounting, between a pair of vertically projecting ears 36, a locking cam 38. The cam 38, selectively engageable with the leg 30 through a suitable opening in the top of the sleeve-like member 34, is controlled by an arm 40 so as to, upon a rotation thereof, lock the leg 30 against the corresponding panel 14 or 24 in an adjusted position suitable so as to lock the leg 32 with the adjoining portion of the box 12. In this manner, it will be appreciated that the dispenser 10 is capable of being accommodated to different size containers or boxes in that both the effective length of the top panel 14 and the effective width of the front panel 24 are adjustable and capable of being clampingly engaged with the corresponding box in their adjusted position.

The dispenser 10 is adapted to utilize the conventional pouring opening 42 normally provided on the front edge or side of containers 12 adjacent the top thereof, such openings being semi-circular as will be best appreciated from FIGURE 6. In order to accommodate the pouring opening 42, the front mounting panel 24, with continued reference to FIGURE 6, is provided with a similarly shaped arcuate recess 44 therein. Paralleling the front panel 24, just inwardly of the upper portion thereof, is a guide plate 46 which includes depending side extensions 48 depending vertically therebelow. This guide plate 46, including the depending coplanar extensions 48, cooperates with the adjoining front panel portion so as to define a guide or guide slot for the gate 50 which selectively segregates the supply box 12 from the dispensing cup 22 in a manner which shall be described presently. Inasmuch as the soap flowing from the container 12 to the cup 22 will also have to pass by guide plate 46, this plate is in turn provided with an arcuate recess 52 in the upper portion thereof corresponding exactly with the recess 44, and thereby the box pouring opening 42.

Mounted inwardly of the guide plate 46, and extending parallel thereto is a mounting plate 54. Incidentally, with regard to FIGURE 6 it should be appreciated that plate 54, as well as a portion of the plate 46 have been exploded away from their normal positon so as to facilitate the illustration of the related structure. The mounting plate 54 includes an upper downwardly tapering configuration which terminates in an elongated depending tongue 56. The tapering upper portion of the plate 54 is in turn provided with a central recess having a forwardly directed flange 58 thereon, this flanged recess corresponding to the recesses 46 and 52 and intimately contacting the upper portion of the guide plate 46 about the recess 52 therein so as to provide for a smooth passage across the plates 54 and 46.

When mounting the dispenser 10, the depending tongue 56 of the mounting plate 54 is engaged through the box opening 42 and the front plate moved downwardly so as to seat the flange 58 on the arcuate portion of the opening 32 and properly orientate the dispenser 10 with the central portion of the box opening 42 in alignment with the powder passing recesses in the parallel plates 54 and 46 as well as the recess 44 in the front panel 24.

The gate 50, vertically slidable within the guide defined by the parallel slightly spaced guide plate 46 and front panel 24, is vertically movable between a first retracted position wherein the upper edge thereof is positioned at the bottom of the powder passage defined by the aligned recesses so as to allow for the free flow of powder thereby, and a second closed position wherein the gate 50 is raised so as to completely close off the recess defined powder passage. With regard to the vertical movement of the gate between the guide plate 46 and front panel 24, it is contemplated that the recesses 44 and 52 therein be provided with suitable flexible seals which will sealingly engage against the gate 50 as it is moved thereby.

The vertical movement of the gate 50 is to be controlled by an elongated wire or cable 60 engaged centrally with the upper edge portion of the gate and extending vertically therefrom through the top of the dispenser 10 just forward of the front end 16 of the top panel 14. This wire 60 is suitably secured to the forward end of an elongated control rod 62 which is in turn pivotally mounted at a central point along the length thereof by means of a raised mount 64 in a manner whereby a depression of the finger accommodating handle 66 on the rear end of the rod 62 will effect a raising of the wire mounting forward end thereof and a corresponding raising of the gate 50 so as to prevent passage of the powder from the main supply to the dispensing cup 22. The gate 50 is to be maintained open under normal conditions, and as such, an elongated coiled tension spring 68 is mounted between the lower portion of the front panel 24 and the lower portion of the gate 50 so as to bias the gate 50 downwardly to its open position. Further, in order to enable the front panel 24 to engage against the front side of the box 26 the biasing spring 68 is mounted on the forward face thereof and engages the gate 50 through a suitable elongate slot 70 provided vertically in the front panel 24, this slot 70 being of a length so as to accommodate the proposed range of movement of the gate 50.

Referring now specifically to the dispenser cup 22, it is intended that this cup be transparent and include graduations on the side thereof whereby a visible predetermined amount of powder can be introduced into the cup 22 prior to its dispensing. Further, in order to insure a complete dispensing of the contents of the cup, it will be noted that the lower longitudinal edges thereof are smoothly rounded while the front face thereof is flat without projecting lips or the like. The forward or discharging end of the cup 22 is provided with a discharge door or gate 72. This door 72 is hingedly mounted to the top of the cup 22 for pivotal movement, in a vertical plane, away from the cup 22 as the cup 22 is tipped through manipulation of the box 12, in a manner contemplated to discharge the contents therefrom. The door 72 is to open simultaneously with the closing of the gate 50 whereby, upon the introduction of the desired amount of powder into the dispensing cup 22, the contents can be immediately discharged therefrom while at the same time precluding further flow from the main box to the cup 22.

The operation of the door 72 is in fact responsive to the vertical movement of the gate 50. With reference to FIGURES 4 and 5, it will be noted that an elongated rod 74 is mounted within a suitable housing 76 below the top of the cup and along one side thereof. This rod 74 has a forward end thereof projecting beyond the housing 76 and engaging the inner surface of the door 72 in a manner whereby an extension of the rod 74 will produce an opening of the door 72. The rear end of the rod 74, including a cam follower head 78 thereon, is located within a vertically extending continuation of the housing 76 forward of the front panel 24, the rod 74 is biased rearwardly by a suitable compression spring 80 engaged centrally thereof and positioned between an abutment 82 fixed to the side wall of the cup 22 and a suitable stop 84 fixed to the rod 74 itself. Forward movement of the rod 74 against the biasing force of the spring 80 is effected by an enlarged cam 86 fixed to the forward face of the gate 50 and projectible through a suitable slot 88 in the front panel 24. This enlarged cam 86 engages against the cam follower head 78 of the rod 74 as the gate 50 is raised and causes a progressive forward pushing of the rod 74 which in turn results in a forward and upward pivoting of the discharge door 72 of the cup 22.

In this manner, it will be appreciated that the segregating gate 50 closes as the dispensing door 72 opens. By the same token, upon a release of the gate and return thereof by the return spring 68, the cam 86 moves away from the rod head 78 allowing for retraction of the rod 74 and the closing of the door 72. Incidentally, with reference to FIGURES 2 and 4, it will be noted that a suitable return spring 90 is provided for effecting a closing movement of the door 72 upon a retraction of the rod 74, this spring 90 being of any suitable type capable of flexing as the door 72 is pushed open by the rod 74 and effectively closing the door 72 upon retraction of the rod 74.

From the foregoing, it will be appreciated that a unique measuring dispenser has been described, this dispenser being mountable upon conventional soap boxes or the like in the manner whereby predetermined portions of soap can be selectively and exactly dispensed therefrom. The mounting of the dispenser 10 is effected by the insertion of the mounting plate 54 through the pour opening 42 of a soap box 12 in a manner so as to seat the arcuate flange 58 on the lower portion of the opening 42 so as to align the passage forming recesses of the dispenser 10 with the opening 42 for the reception of soap therethrough. Next, both the top and front mounting plates 14 and 24 are clamped to the box itself through the adjustable clips 26 and the dispenser is ready for use.

Particular attention is directed to FIGURES 7 and 8 wherein a modified unit has been illustrated. This unit provides for an integral forming of the dispenser 92 and an enlarged supply container 94 through the utilization of the front wall 96 of the container as the mounting plate for the dispenser 92. In other words, the dispensing cup 98 is mounted directly on the front wall 96 of the container 94 with the guide plate 100 paralleling the front wall 96 inwardly thereof for the sliding accommodation of the vertically movable gate 102. By the same token, the biasing spring 104 utilized in opening the gate will also be located within the container 94 itself. The top mounting plate 106 is also to function as a closure for an enlarged opening defined in the top of the container 94, this opening being utilized to fill the container itself which is to be of relatively permanent nature, formed of plastic or the like, and periodically filled from conventional soap boxes. The mounting plate 106 is to be hingedly mounted at the forward end 108 thereof in a manner which will enable an opening of substantially the entire top of the container. The operation of the gate 102 is to be controlled from a pivotally mounted control rod 110 in the same manner as noted supra with regard to the dispenser 10. Finally, in order to faciliate a handling of the unit of FIGURES 7 and 8, it will be noted that a portion of the rear wall, adjacent the upper end thereof, has been angled inwardly and provided with a gripping handle 112 located immediately below the handle 114 on the control rod 110. In this manner, the entire container can be manipulated with one hand, this hand gripping the handle 112 and working the control rod handle 114 with the thumb. Any suitable catch means can be provided so as to lock the top panel 106 to the container 94 during the use of the dispenser 92. For example, it will be noted that spring like clips 116 have been illustrated on opposite sides of the rear end of the plate 106 for engagement with the opposite faces of the container 94. While not detailed, it will of course be appreciated that the dispensing cup 98 is provided with a selectively openable door 118 operated in the same manner as that on the dispenser 10 in response to a closing of the gate 102 over the aligned recesses in the front wall 96 of the container 94 and in the back plate 100. From the foregoing, it will be appreciated that the unit of FIGURE 7 incorporates much of the basically unique features of that illustrated in FIGURES 1–6, including the simultaneously operable segregating gate and dispensing door.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A measuring dispenser for use in conjunction with a container, said dispenser comprising a measuring cup mountable on said container with one end of the cup penetrating a side panel of said container at a point below the container top and being in material receiving relation therewith, gate means normally held open mounted rearward of said one end of the cup between said one end and the interior of said container, lever means coupled to said gate means for selectively closing said gate means thereby preventing communication between said container and said cup, the second end of said cup defining a dispensing opening, openable door means closing said dispensing opening, and means operatively associating said door means with said gate means comprising an elongated operating rod enclosed within said measuring cup, engaging said door means and actuable so as to push open said door means, a head on said rod, and a cam member on said gate means engageable against said rod head as said gate means closes so as to actuate said rod and open said door means.

2. The dispenser of claim 1 including a mounting panel engaged with and projecting rearwardly from said cup above said one end, said lever means comprising an elongated control knob longitudinally oriented and pivotally mounted on said panel, means engaging a first end of said rod with gate means for effecting a closing movement of said gate means upon a pivoting of said rod in response to a movement of the second end of said rod, said second end of said rod including a finger handle digitally engageable by a hand grasping the upper corner of said container and depressing to dispense container contents when said container is positioned with said finger handle pointing upwardly.

3. The dispenser of claim 2 including releasable clamping means on said mounting panel causing the container to deform around said clamping means thereby effecting locking engagement with the container.

4. The dispenser of claim 3 including means hingedly engaging said mounting panel with said cup for vertical pivotal movement relative thereto.

5. The dispenser of claim 3 including a mounting plate fixed to said cup, said mounting plate paralleling said one end of the cup rearward of said gate means for engagement within the container.

6. The dispenser of claim 5 including a vertical front panel, said one end of said cup being fixed to said front panel adjacent the upper end thereof and projecting forwardly therefrom, and releasable clamping means on said front panel causing the container to deform around said clamping means thereby effecting locking engagement with the container.

7. The dispenser of claim 6 wherein said measuring cup is transparent and has graduations and indicia indicated thereon and wherein said indicia is oriented to be read when said door means is positioned downwardly.

8. A measuring dispenser for use in conjunction with a container, said dispenser comprising a measuring cup mountable on said container with one end of the cup penetrating a side panel of said container at a point below the container top and being in material receiving relation therewith, gate means normally held open mounted rearward of said one end of the cup between said one end and the interior of said container, lever means coupled to said gate means for selectively closing said gate means thereby preventing communication between said container and said cup, the second end of said cup defining a dispensing opening, openable door means closing said dispensing opening, and means operatively associating said door means with said gate means comprising an elongated operating rod engaging said door means and actuable so as to push open said door means, a head on said rod, and a cam member on said gate means engageable against said rod head as said gate means closes so as to actuate said rod and open said door means, a mounting panel engaged with and projecting rearwardly from said cup above said one end, said lever means comprising an elongated control knob longitudinally oriented and pivotally mounted on said panel, means engaging a first end of said rod with gate means for effecting a closing movement of said gate means upon a pivoting of said rod in response to a movement of the second end of said rod, said second end of said rod including a finger handle digitally engageable by a hand grasping the upper corner of said container and depressing to dispense container contents when said container is positioned with said finger handle pointing upwardly, releasable clamping means on said mounting panel causing the container to deform around said clamping means thereby effecting locking engagement with the container, a mounting plate fixed to said cup, said mounting plate paralleling said one end of the cup rearwardly of said gate means for engagement within the container, the top edge of said mounting plate characterized by an arcuate lip, a vertical front panel, said one end of said cup being fixed to said front panel adjacent the upper end thereof and projecting forwardly therefrom, and releasable clamping means on said front panel causing the container to deform around said clamping means thereby effecting locking engagement with the container, said measuring cup being transparent and having graduations and indicia indicated thereon and wherein said indicia is oriented to be read when said door means is positioned downwardly.

References Cited
UNITED STATES PATENTS

| | | | |
|---|---|---|---|
| 1,962,812 | 6/1934 | Euler | 222—446 |
| 2,005,919 | 6/1935 | Militello | 222—446 X |
| 2,173,988 | 9/1939 | Vernick | 222—445 X |
| 3,209,961 | 10/1965 | Wassell | 222—450 X |

ROBERT B. REEVES, *Primary Examiner.*

HADD S. LANE, *Examiner.*